Feb. 23, 1954 R. F. STEHLIK 2,670,087
SORTING APPARATUS
Filed Aug. 4, 1948 15 Sheets-Sheet 1

INVENTOR.
RUDOLPH FRANK STEHLIK
BY
ATTY.

Feb. 23, 1954  R. F. STEHLIK  2,670,087
SORTING APPARATUS
Filed Aug. 4, 1948  15 Sheets-Sheet 2

INVENTOR.
RUDOLPH FRANK STEHLIK,
Chas. M. Candy
ATTORNEY

Feb. 23, 1954 R. F. STEHLIK 2,670,087
SORTING APPARATUS
Filed Aug. 4, 1948 15 Sheets-Sheet 3

INVENTOR
RUDOLPH FRANK STEHLIK,
BY Chas. Fr. Candy
ATTORNEY

Feb. 23, 1954 R. F. STEHLIK 2,670,087
SORTING APPARATUS

Filed Aug. 4, 1948 15 Sheets-Sheet 4

INVENTOR.
RUDOLPH FRANK STEHLIK
BY
ATTY.

Feb. 23, 1954   R. F. STEHLIK   2,670,087
SORTING APPARATUS

Filed Aug. 4, 1948   15 Sheets-Sheet 5

INVENTOR.
RUDOLPH FRANK STEHLIK
BY

ATTY.

Feb. 23, 1954 R. F. STEHLIK 2,670,087
SORTING APPARATUS
Filed Aug. 4, 1948 15 Sheets-Sheet 8

INVENTOR
RUDOLPH FRANK STEHLIK
Chas. M. Candy
ATTORNEY

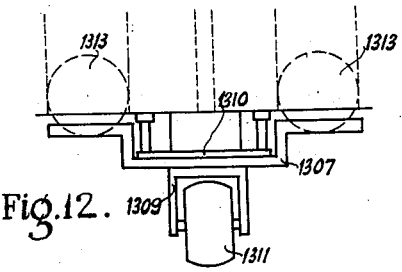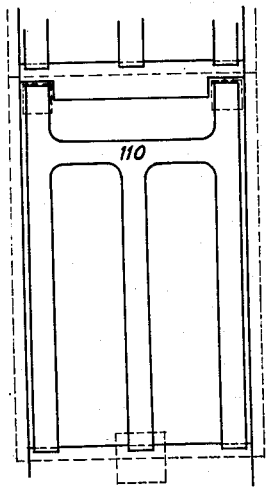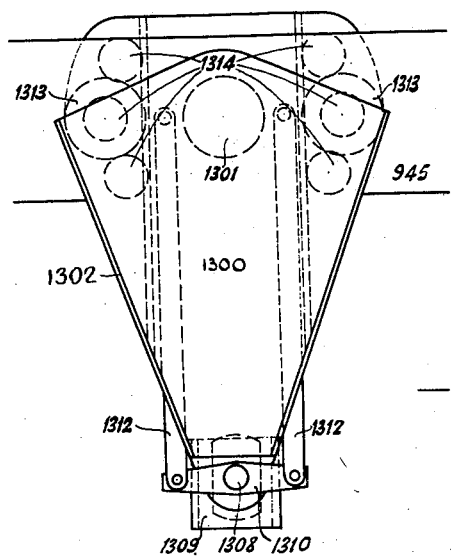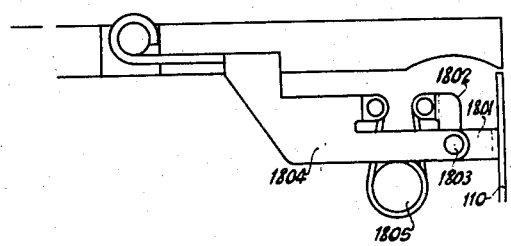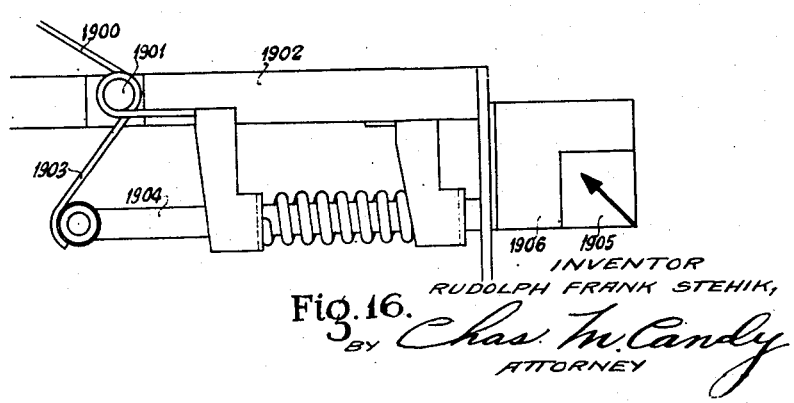

Feb. 23, 1954      R. F. STEHLIK      2,670,087
SORTING APPARATUS
Filed Aug. 4, 1948      15 Sheets-Sheet 10
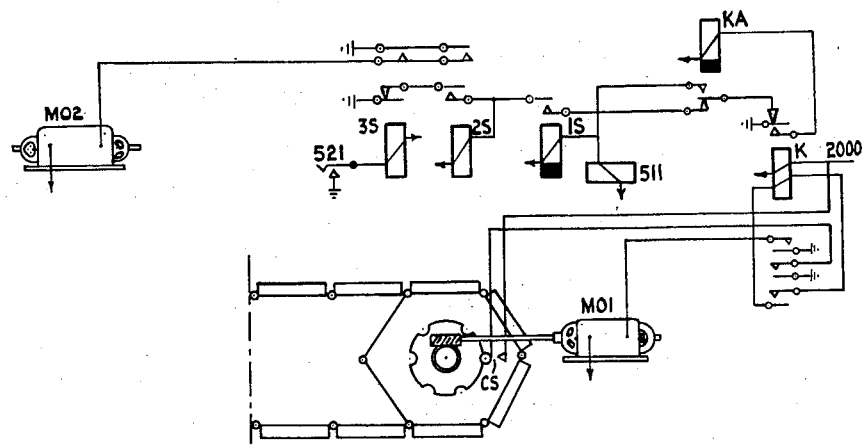
FIG 17.
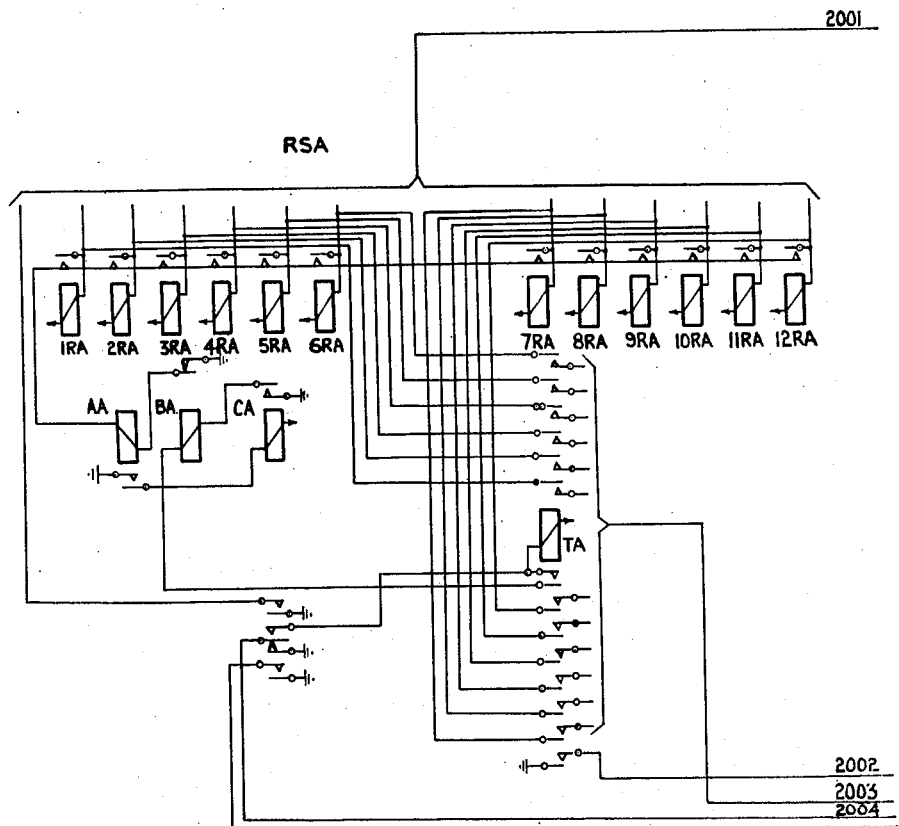
INVENTOR
RUDOLPH FRANK STEHLIK
BY *Chas. M. Candy*
ATTORNEY Feb. 23, 1954  R. F. STEHLIK  2,670,087
SORTING APPARATUS Filed Aug. 4, 1948  15 Sheets-Sheet 11

INVENTOR
RUDOLPH FRANK STELIK,
BY Chas. M. Candy
ATTORNEY

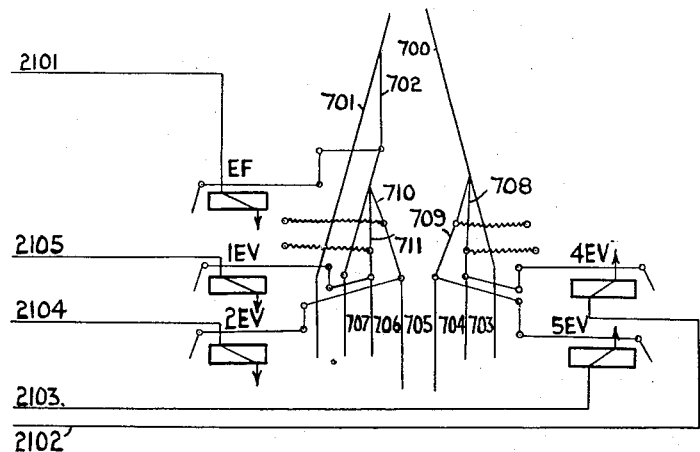
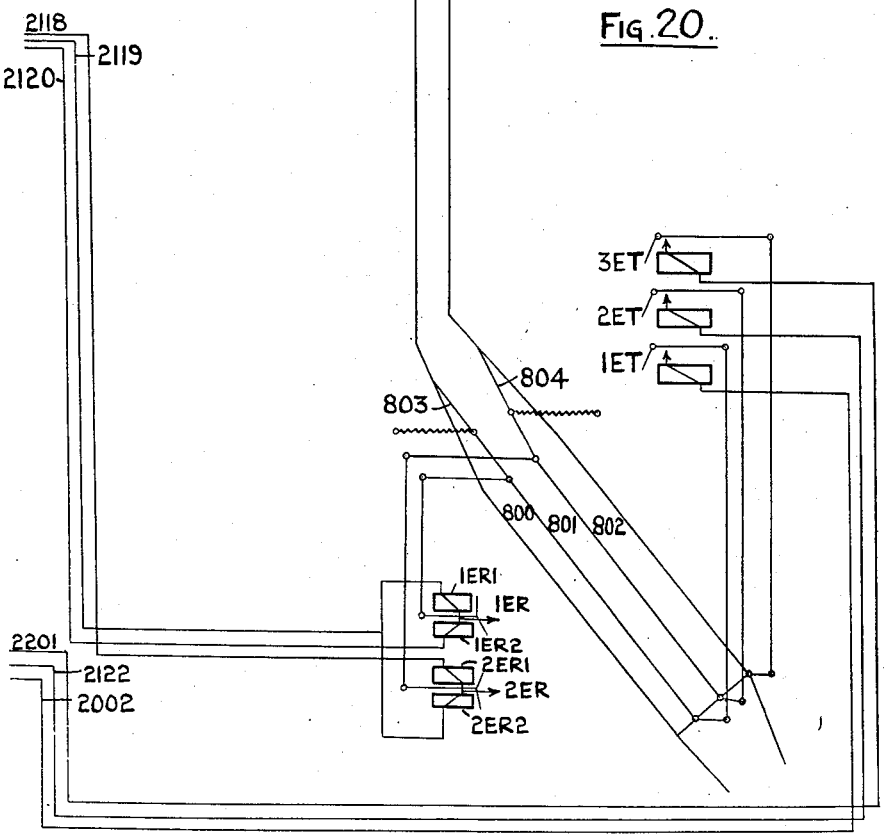
Fig. 20.

Feb. 23, 1954  R. F. STEHLIK  2,670,087
SORTING APPARATUS

Filed Aug. 4, 1948  15 Sheets-Sheet 15

INVENTOR
RUDOLPH FRANK STEHLIK,
BY Chas. M. Candy
ATTORNEY

UNITED STATES PATENT OFFICE 2,670,087

SORTING APPARATUS

Rudolph Frank Stehlik, Antwerp, Belgium, assignor to Automatic Electric Laboratories Inc., Chicago, Ill., a corporation of Delaware Application August 4, 1948, Serial No. 42,419

16 Claims. (Cl. 214—11)

The present invention relates to apparatus for sorting articles and is more particularly concerned with the sorting of small packages such as mail.

The problem of relieving the burden of letter sorting has been given considerable attention and several machines, either entirely mechanical or part mechanical and part electrical, have been designed to eliminate to some extent the human element in letter sorting. It will be understood that a satisfactory solution of the problem is difficult owing to the number of variables present and while the prior arrangements have provided considerable relief, they do not attain the degree of improvement which is necessary and possible.

Generally speaking the layout of mail sorting apparatus is similar for different types of apparatus and consists of a plurality of receptacles into which the mail is discharged. Above the top of the receptacles is arranged a platform on which the operators are seated and each operator is provided with a keyboard, operation of which controls a letter carrier so that it discharges its contents into the appropriate receptacle. Usually the letter carriers are arranged to move at uniform speed past the operators' positions and past the receptacles in a single continuous chain which introduces the disadvantage that the speed of operation of the operators is determined by the speed of movement of the letter carriers. A further disadvantage of the prior arrangements resided in the fact that by their very nature it was essential to allocate particular letter carriers to particular operators' positions. Thus, to obtain the maximum efficiency of the system, the operator must work at a given fixed speed and such working is not always easily realised since while one operator may have to deal with a succession of correctly and legibly addressed letters, another operator may during the same period have to deal with some which are legibly and others which are illegibly or incorrectly addressed and the speed of movement of the letter carriers has to be a compromise between the two possible speeds of operation. Further, by requiring that one operator may only use particular ones of the letter carriers, the arrangement lacks the flexibility which a satisfactory arrangement should possess.

It is the main object of the present invention to provide an arrangement in which a complete independence of one operator from another and of each operator from the speed of movement of the letter carriers is attained. Other objects of the invention are the introduction of a number of desirable features which have not previously been incorporated in letter sorting apparatus.

In the present invention any number of operator positions may be provided. Stacks of unsorted articles are loaded into the apparatus. One by one, the articles are automatically fed to one of the operator positions where the operator reads the destination marked thereon and operates appropriate switches or keys of a control board located at each operator position. This routes the article to a particular one of a number of chutes or channels, each leading to a different moving chain which carries a number of article carriers.

The article will be deposited on the first carrier to appear, unless this carrier is already loaded, in which case, the article will be held until an empty carrier appears. Should other articles be routed to the same chain of carriers by the same operator before the first article is deposited onto an empty carrier, the subsequent articles will be stored in separate reservoirs, to be deposited into empty carriers in the order in which the articles left the operator position, as empty carriers arrive at the reservoir.

Collection receptacles into which articles are to be finally deposited, are uniformly arranged about the machine in horizontal rows and vertical columns. All of the carriers in one particular chain have access to all of the receptacles in one particular horizontal row.

As an article is deposited onto a carrier from the storing reservoir, the carrier is given a code marking determined by the operator. All of the collection receptacles have permanent code markings. When the moving carrier reaches a receptacle bearing a code marking which is in accord with the code marking on the carrier, the article is discharged from the carrier into the receptacle, under a positive driving force.

The code marking on each receptacle consists of a simple strapping between particular pairs of electrical contacts. The code marking on the carriers is accomplished by setting variably-positioned conducting members provided on the carrier.

In one embodiment of the invention it is proposed to employ five letter carrying chains arranged to move in a substantially oval path. Each vertical column of letter receptacles will then comprise five receptacles and it is proposed to employ 60 vertical columns giving a possible total of 300 receptacles. Six operators' positions are arranged around the oval path of the carrier chains above the top of the receptacles which are also positioned around the oval path in six groups of 10. It will be understood that according to this embodiment of the invention all the receptacles need not represent different destinations but that corresponding receptacles in each group could be employed for frequently-occurring destinations with consequent economy in the use of the carriers since a carrier having a letter deposited therein at one operator's position for such a destination would be emptied and available for use before it arrives at the next operator's position.

The invention will be better understood from the following description of one embodiment taken in conjunction with the accompanying drawings comprising Figs. 1 to 23 in which.

Figure 3:
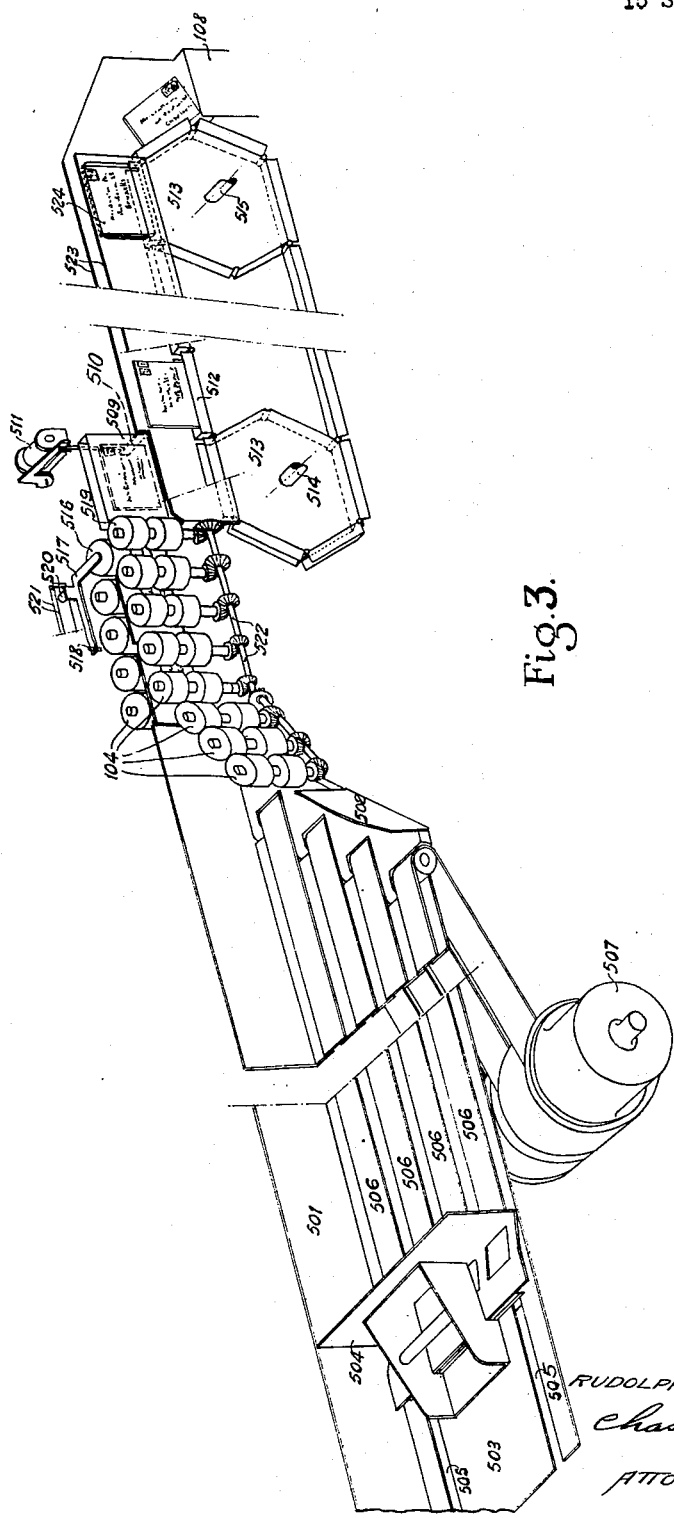
Figure 4:
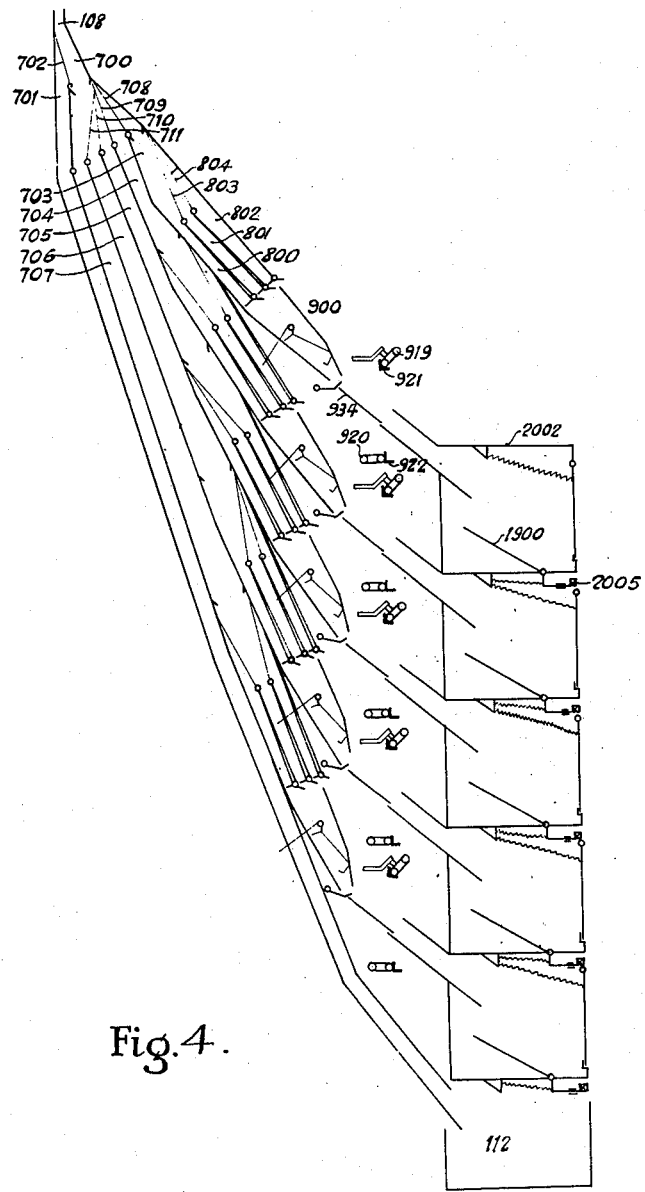
Figure 5:
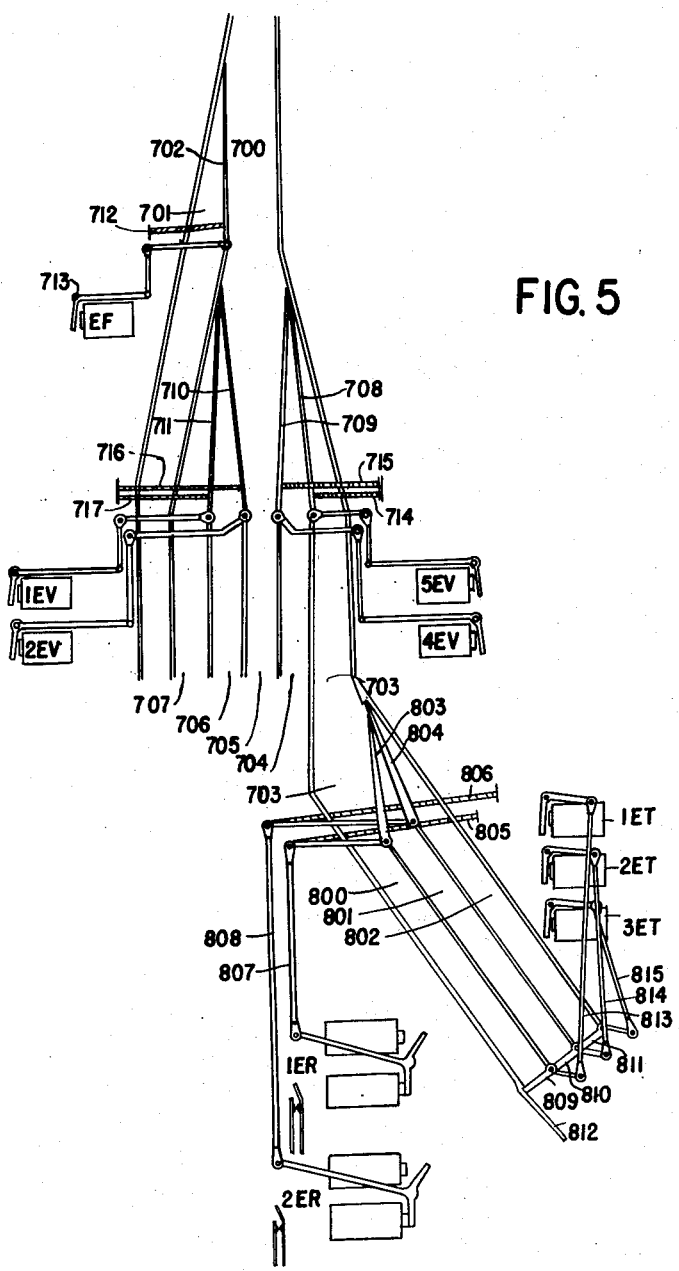
Figure 6:
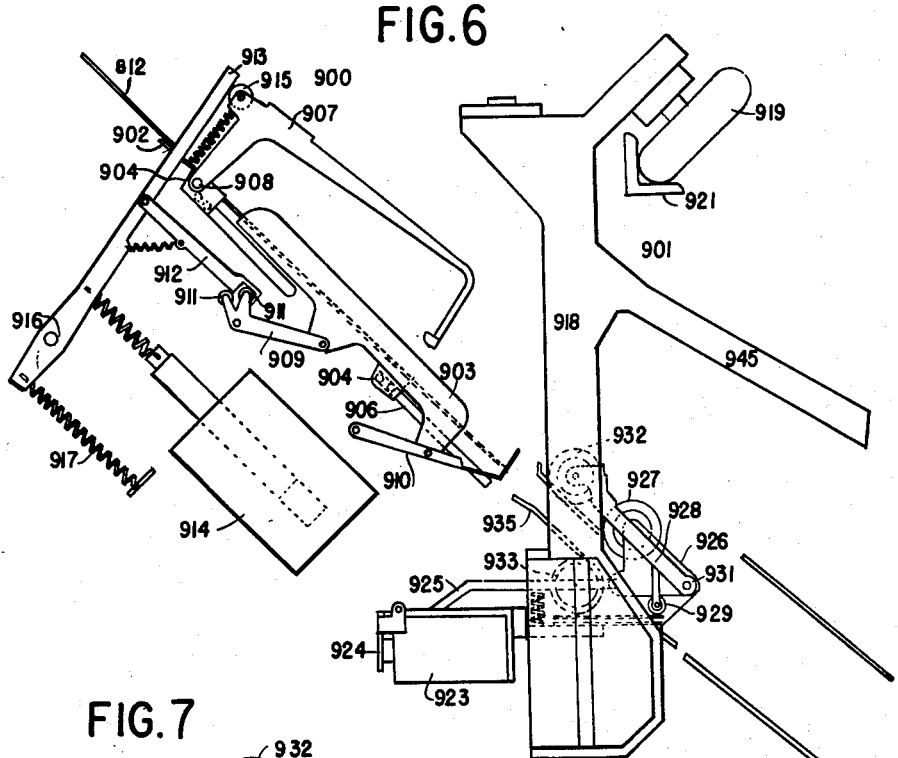
Figure 7:
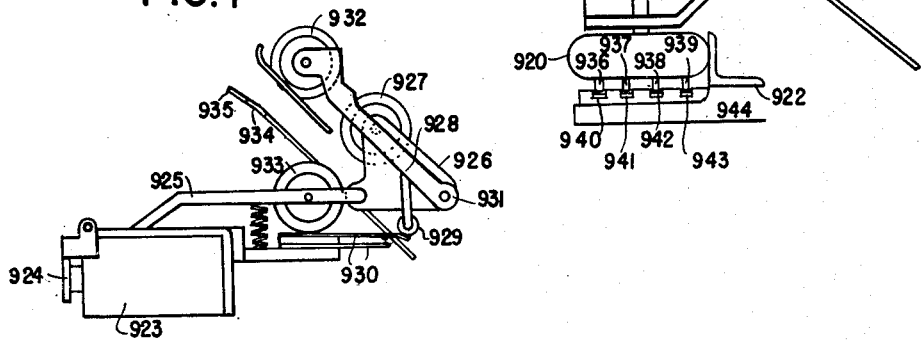
Figure 8:
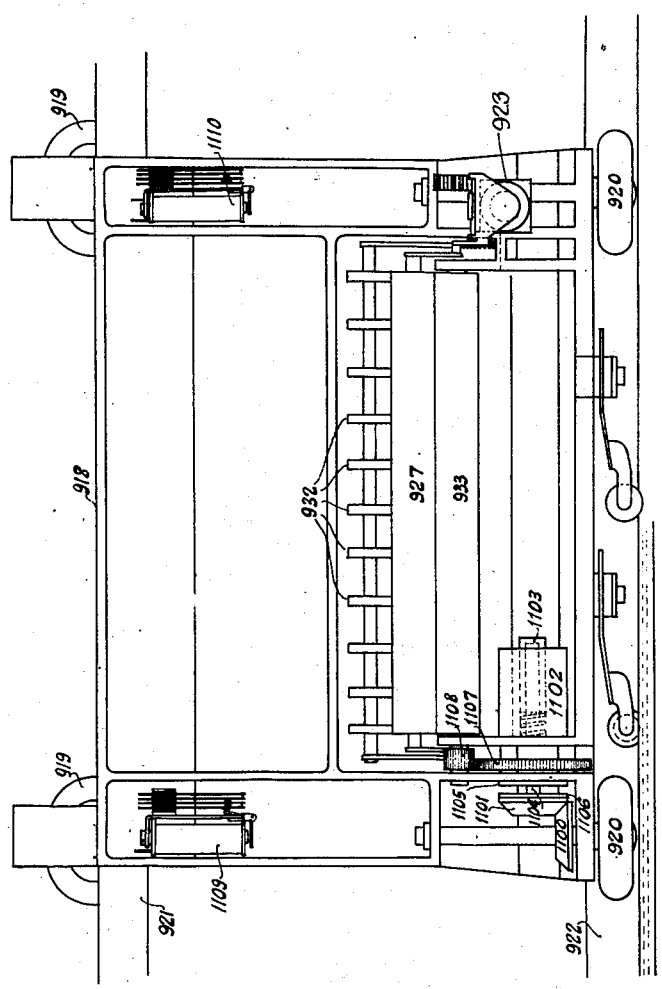
Figure 9:
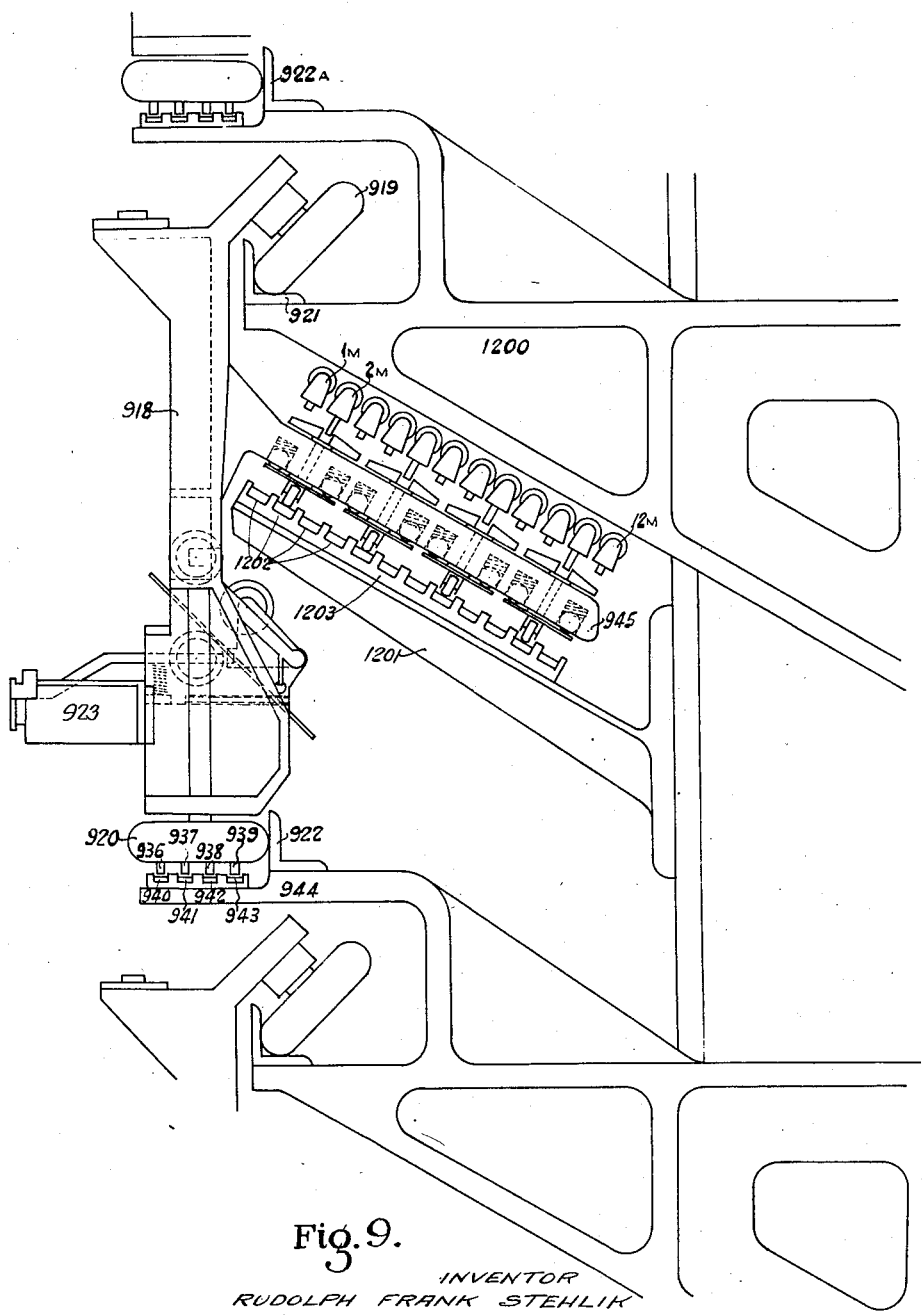
Figure 21:
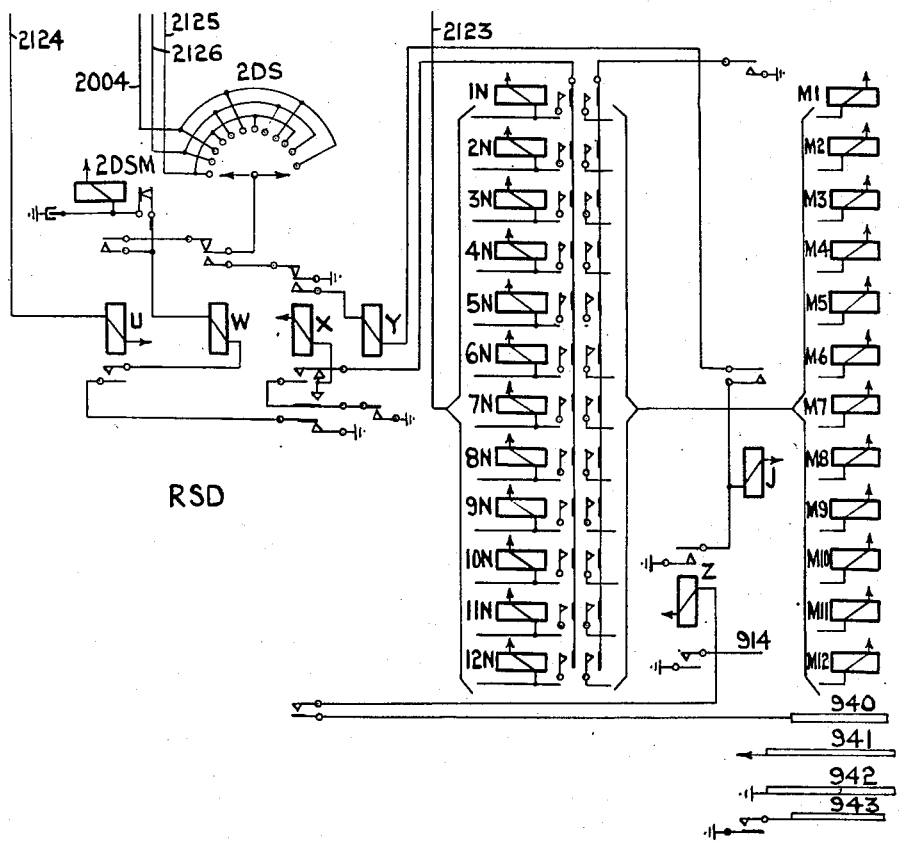
Figure 22:
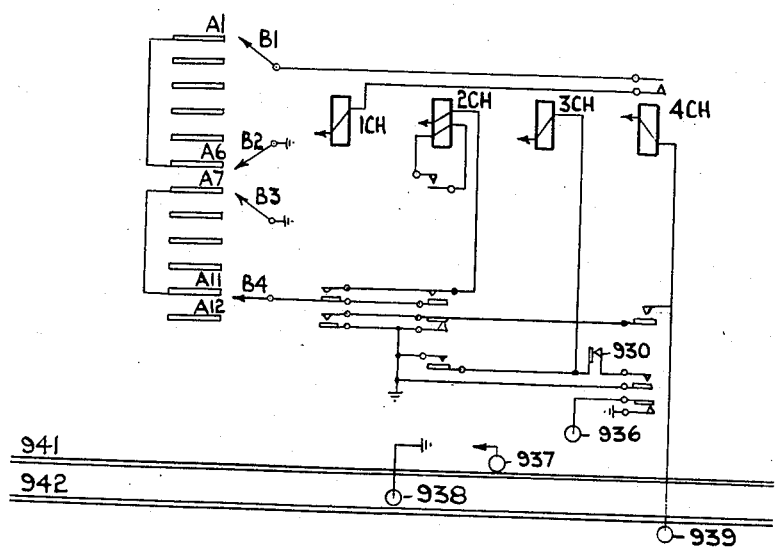
Figure 23:
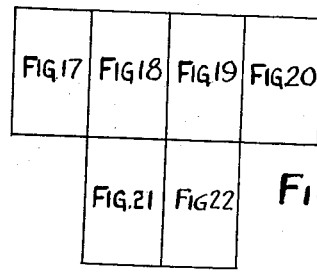

Fig. 3 shows the arrangements used for feeding the letters to a conveyor which carries the letters one-by-one in front of a sorter's position, Fig. 4 shows diagramatically the construction of one of the chutes into which the letters pass from the conveyor, Fig. 5 shows the construction of the upper and lower portion of the chute, Fig. 6 shows the construction of the discharge channel and one of the letter carriers, Fig. 7 shows in greater detail the construction of the discharge channel of the letter carrier, Fig. 8 shows the general construction of the letter carrier, Fig. 9 shows the arrangement for setting the letter carrier so that it will discharge the letter into the correct letter or destination receptacle, Figs. 10, 11, 12 and 13 show the setting arrangements in greater detail, Figs. 14 and 15 show the spring gate closure for the receptacles, Fig. 16 shows the arrangements for indicating when a receptacle is full and Figs. 17-22 when arranged as shown in Fig. 23 are the electrical circuits for controlling the operation of the equipment.

Figure 1:
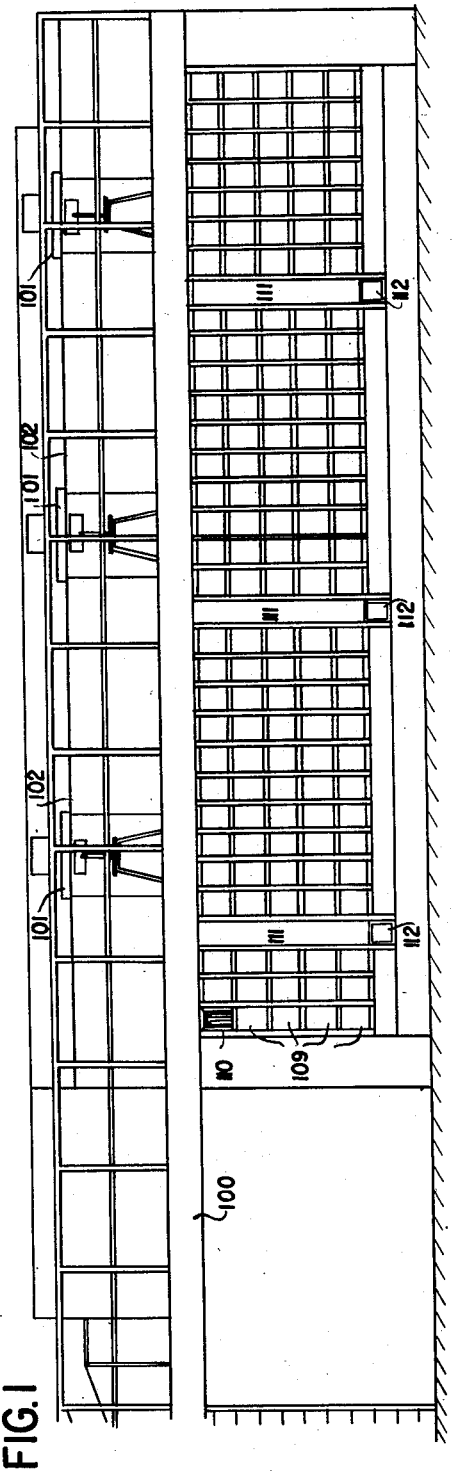
Fig. 1 shows a front elevation of the whole equipment.
Figure 2:
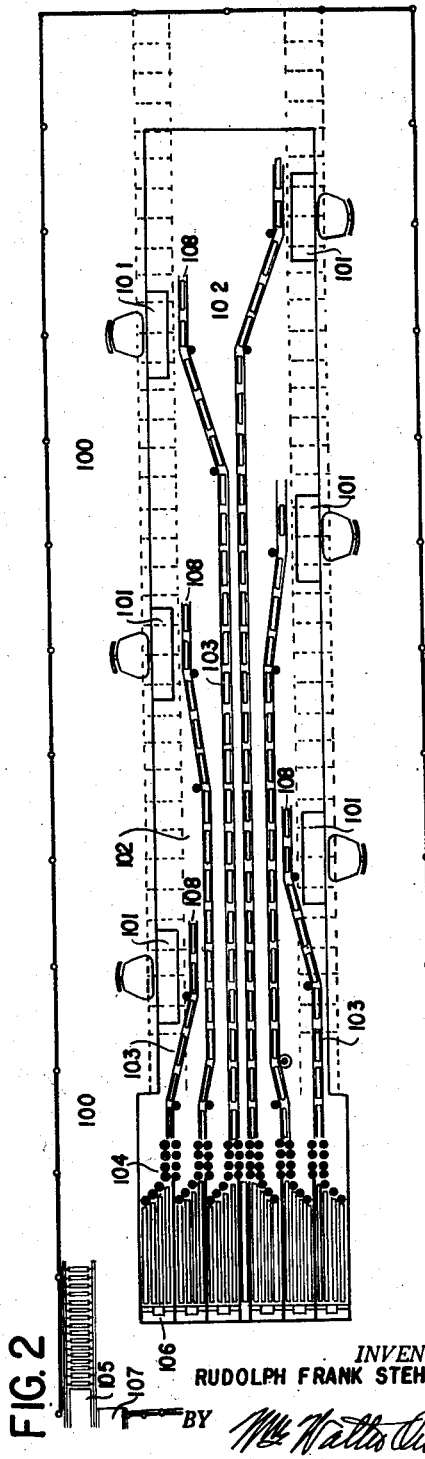
Fig. 2 shows a plan view of the whole equipment.

The general arrangement of the equipment will be seen from Figs. 1 and 2 of which Fig. 1 shows a front elevation and Fig. 2 shows a plan view. The equipment consists of a raised platform 100 with a number of operator's positions 101 arranged symmetrically around a table 102. Each operator's position has associated with it a conveyor 103 which is fed from the series of rollers 104 shown diagrammatically at the left-hand side of Fig. 2. The letters are transported to the equipment in boxes by means of a common conveyor 105 from which they are taken manually and deposited in feed arrangements 106 associated with each set of rollers 104, care being taken to ensure that none of the feed arrangements are allowed to become empty. When a box is empty it is returned for refilling down the slide 107. Each individual conveyor terminates just beyond the associated operator's position in a chute 108 and the letters are directed along channels in the chutes in accordance with the operation of keys on a keyboard individual to each operator's position.

The destination or letter receptacles 109 are arranged in columns underneath the platform 100, corresponding receptacles in the columns being individual to a particular carrier chain. The front of the receptacles are closed by a door 110 shown only for one receptacle in Fig. 1, the door being in the form of three prongs hinged at the top. The electrical equipment is housed behind panels such as 111 (Fig. 1) while the receptacle 112 (Fig. 1) is the "dead letter" receptacle.

The arrangement for feeding the letters to an individual conveyor is shown in Fig. 3 and consists of two fixed parallel side walls of which one only, 501, is shown and an inclined wall 502 making an angle of approximately 55° with the fixed wall, the three walls and the base 503 forming a channel with a tapering end. A movable wall 504 works in slots 505 in the base 503 of the channel and is secured to bands 506 which are connected to spring-urged pulleys 507 to cause the movable wall to exert a pressure on the letters whereby they are continuously urged against sets of rollers 104. The rollers 104 are vertically arranged adjacent to the sloping wall 502 and are driven through the gearing shown in such a manner that the speed of rotation of the rollers increases in the direction of movement of the letter. Thus it will be understood that as the letters are urged forward by the movable wall 504, the letter in the front will be separated from the adjacent letter owing to the difference in speed of rotation of the rollers and hence the letters will be advanced one by one between the rollers and fed into the container 509. The container 509 has a movable base or trap 510 which is under the control of the magnet 511. The container is positioned above the conveyor which consists of a number of trays 512 suitably hinged together and passing over hexagonal driving members 513. The driving members 513 are mounted on shafts 514 and 515 of which 515 is driven by an electric motor (not shown in Fig. 3). The conveyor is moved one step each time the operator keys up a destination and at the end of a step, the magnet 511 is momentarily operated to move the trap 510 whereupon the letter in the container is discharged into the empty tray which has been positioned under the container 509.

One pair 516 of the last set of rollers is carried by a pair of arms of which one, 517, only is shown in Fig. 3. These arms are pivoted on a spindle 518 which is spring-controlled to move the pair of rollers 516 towards the other pair 519 of the set. The arm 517 carries an operating member 520 which controls the spring contact pair 521 in such a manner that these contacts are closed by the operating member 520 whenever a letter is between the rollers 516 and 519. The contacts 521 control the opening of the circuit of the motor (not shown in Fig. 3) which drives the rollers through the shaft 522, the closing of the motor circuit being effected when the operator keys up a destination. This operation will be explained in greater detail when the electrical control circuits of the equipment are described.

The trays carrying the letters pass between walls 523, the front one of which is provided with a window 524 opposite to the associated operator's position. Each step of the conveyor thus brings a letter to the window and the operator upon reading the address thereupon keys up the destination on the keyboard. The conveyor then makes a further step and the letter slides from the tray into the chute 108.

As an alternative to having the rollers 104 rotating at progressively increasing speeds, it would be sufficient if the rollers on one side of the letter were rotated at one constant speed while the rollers on the other side of the letter were rotated at a slightly lower constant speed. By this means, if two letters were engaged by the rollers, they would be separated during their travel between the rollers.

The arrangement of the parts whereby a letter passes from the chute to the destination or letter receptacle is shown schematically in Fig. 4. The chute 108 has a main portion 700 and a subsidiary portion 701, the letter passing to one or the other portion according to the position of an electromagnetically-operated vane 702. Dead letters are directed to the subsidiary portion and pass to the dead letter receptacle 112. The main portion of the chute is divided into five channels 703, 704, 705, 706 and 707, entry to which is controlled by vanes 708, 709, 710 and 711. Each channel is divided into three reservoirs 800, 801 and 802 controlled by vanes 803 and 804. Letters are fed to the reservoirs in the order 800, 801, 802 and are fed from the storage reservoirs to a discharge reservoir 900 in the same order. The letter is held in the discharge reservoir 900 until an available letter carrier 901 (Fig. 6) passes the discharge reservoir when the letter is released and passes into and is held in the letter carrier. The letter carriers are indicated in Fig. 4 by the two driving wheels 919, 920 resting on rails 921, 922 and by plate 934 on which the letter rests. The letter is then transported in the carrier until it is adjacent the appropriate receptacle 1900 when it is released and falls under gravity into the receptacle.

The construction of the chute 108 is shown in greater detail in Fig. 5. The vane 702 which directs the letters into the main portion 700 or the subsidiary portion 701 is controlled by the spring 712 to open the main portion 700 of the chute. The vane is operated to its other position to thereby close the main portion 700 and open the subsidiary portion 701 by an electromagnet EF, the operation of which causes the armature and the associated linkage to pivot about the point 713. The vanes 708—711 which control the entry into the five channels 703—707 are similarly controlled by springs 714, 715, 716, 717 and electromagnets 5EV, 4EV, 2EV and 1EV. In the normal position, all the electromagnets are de-energised, giving entry into the center channel 705. The circuits for controlling the operation of the vanes in accordance with the operation of the keys at the operator's position will be described in detail subsequently.

The control of the vanes which divide each channel into three storage reservoirs is shown in detail in Fig. 5 which shows one channel, for instance, the channel 703. This is divided into three storage reservoirs 800, 801 and 802 and entry into the reservoirs is controlled by the two vanes 803 and 804. As shown in the drawing, the vanes are in the position in which the first reservoir 800 is open and they are controlled to open the other reservoirs jointly under the control of springs 805, 806 and links 807 and 808 attached to the armatures of the electromagnets 1ER and 2ER respectively. A letter arriving with the vanes in this position will fall into the storage reservoir 800. On the arrival of the next letter, the electromagnets 1ER are operated to close the reservoir 800 and to open the reservoir 801 so that the letter is deposited in the reservoir 801. Finally, if no discharge has taken place by the time the third letter arrives, this will be deposited in the reservoir 802. The method of operation of the electromagnets will be described in detail when considering the electrical control circuits.

The letters pass from the storage reservoirs to a discharge reservoir (not shown in Fig. 5) under the control of magnets 1ET, 2ET and 3ET which control the traps 809, 810 and 811 closing the reservoirs, the magnets operating successively so that the letters are discharged down the plate 812 in the same order as that in which they were received. The traps are controlled by links 813, 814 and 815 attached to the armatures of the electromagnets.

When a letter is discharged from one of the storage reservoirs, it is held in a discharge reservoir shown in detail in Fig. 6 and indicated generally therein by the reference 900. This discharge reservoir retains the letter by stop lever 910 until such time as an idle carrier such as 901 registers therewith. The discharge reservoir consists of a base 902 and two parallel side plates 903. An arm 907 is pivoted at 908 to one of the lugs 904 and is connected by a spring to plate 902 while the side walls 903 are maintained in position by means of levers 909 and 910 pivoted thereto. These levers are pivoted to the mounting plate, the lever 910 forming a stop for the letter. The lever 909 is forked, each fork bearing a roller 911, one of which is normally positioned in a recess in a lever 912 which is pivoted to the lever 913 of a plunger type solenoid 914. The lever 913 also acts on the arm 907 through the roller 915 and on the plate 902 through an aperture 946 in the plate 902 and is pivoted at 916. It is normally biased to the position shown in the drawing by means of a spring 917 so that on the energisation of the solenoid, the lever 913 rotates in a clockwise direction about the pivot 916.

The letter is discharged from the discharge reservoir into the letter carrier upon the energisation of the solenoid 914 which takes place when an available letter carrier is adjacent to the discharge reservoir. The energisation of the solenoid causes the clockwise rotation about pivot 916 of the lever 913 which effects the following operations (Fig. 6). During the first stage of the rotation, the arm 907 is rotated clockwise about the pivot 908 until it engages with the letter resting on the plate 902, the letter being henceforth held down between the plate and the arm. Further rotation of the lever 913 now causes the plate 902 and, of course, the arm 907 to be moved downwardly towards the letter carrier, the plate being guided in the slots 906. As will be subsequently described, the letter is gripped between rollers on the carrier and drawn into the carrier. Also, during the initial movement of the lever 913, the lever 912 will move substantially in the direction of its own length to cause clockwise rotation of the lever 909 whereby the side walls 903 are lowered below the plate 902, the right-hand roller 911 being withdrawn from the recess so that both rollers now ride on the underside of the lever 912 to prevent the side walls rising until the return to normal of the armature. This lowering of the side walls is necessary since the carrier is continuously moving so that there is bound to be some sideways movement of the letter during transfer. The lowering of the walls also causes clockwise rotation of the stop lever 910 to allow passage of the letter to the carrier.

The letter carrier 901 consists of a frame 918 (Fig. 6) provided with wheels 919 and 920 running on rails 921 and 922 respectively. At present, the carrier will be described only as regards the mechanism for withdrawing a letter from the discharge reservoir. This mechanism, as better seen in Fig. 7, comprises an electromagnet 923 secured to the frame 918 and having an armature 924, an extension 925 of which is pivoted to a mounting 926 which is itself pivoted at 931 to the framework and carries the roller 927. An arm 928 is pivoted also at 931 and carries an operating member 929 for controlling the contact springs 930 and also a roller 932, the roller 932 being urged toward the plate 935 by a suitable means such as a spring (not shown). The roller 927 is adapted to engage with a roller 933 on energisation of the magnet 923, the latter roller being driven from a suitable source of power as described subsequently.

When the electromagnet is energised, the armature extension 925 causes the mounting 926 to move counterclockwise about the pivot 931 so as to cause the roller 927 to move towards and engage the roller 933. The energisation of the electromagnet is arranged to take place slightly after that of the solenoid 914 so that the letter is moving towards the carrier by the time the electromagnet is energised. When the letter passes under the roller 932, the letter forces the roller 932 away from plate 935 causing arm 928 to rotate about pin 931 in a clockwise direction which in turn causes contacts 930 to close due to the movement of member 929. These contacts complete a circuit to cause the roller 933 to be driven in a clockwise direction in a manner hereinafter described. The letter, which has now been positioned between the rollers 933 and 927 by the discharge reservoir mechanism, is seized by the rollers and moved into the letter carrier.

When the letter has passed the roller 932, the latter passes through a slot 934 in the plate 935 to cause anti-clockwise rotation of the arm 928 whereupon contacts 930 open. The opening of contacts 930, as described later, disconnects the drive from the roller 933, so that the letter is held between the rollers 927 and 933 and in the position in which the rear end has just passed the roller 932. It will thus be understood that with this arrangement each letter, irrespective of its size, will be held in the carrier in such a manner that when it is to be discharged into the appropriate destination receptacle, a small movement only is necessary and the extent of the movement is substantially the same for all letters. The discharge of the letter into the destination receptacle is controlled electrically in a manner to be described later, but the effect as regards the mechanical equipment is to cause the roller 933 to be again connected to the source of power for a pre-determined period sufficient to feed the letter into the receptacle.

The carrier also carries four electrically conducting rollers 936, 937, 938 and 939 which engage conducting strips 940, 941, 942 and 943 inset into an insulating base 944 secured to the rail 922. Two of these conducting strips are continuous along the carrier track while two consist of short lengths located adjacent the chute at an operator's position. The rollers serve to complete circuits between the electrical equipment on the carrier and the electrical equipment associated with the operators' positions.

The carrier is also provided with an arm 945 having arrangements which, under the control of a group of magnets provided at each operator's position, are set to characterize a particular destination receptacle as determined by the operation of the appropriate keys by the operator. These arrangements will be described in detail subsequently.

The general construction of the letter carrier is shown in Figs. 8 and 9 and it should be explained at this stage that all the carriers in a particular chain are driven by an electric motor mounted on one of the carriers in place of the usual rollers and other mechanism. Adjacent carriers are connected together so that the single motor drives the whole chain. The motors are of the variable speed type to enable the speed of travel of the chains to be varied as previously mentioned. The mechanical drive to the rollers 933 on the remaining carriers is taken from the left-hand one of the rollers 920 by means of continuously-meshing bevel wheels 1100 and 1101. A plunger-type solenoid 1102 is provided on each carrier and the plunger 1103 which is coaxial with the spindle 1104 of the bevel 1101 is provided with a clutch plate 1105 which, when the solenoid is energised, engages with a similar plate 1106 on the rear of the bevel 1101. Movement is then transmitted from the bevel 1101 through the spur wheels 1107 and 1108 to the driven roller 933. In addition to the solenoid 1102 and the electromagnet 923, the carrier also carries two relays 1109 and 1110, the operation of which will be described when considering the electrical control of the equipment.

Referring now to Fig. 9, this shows the mounting arrangements for the rails on which the carriers run and also the positional relation between the carrier chains. An arm indicated generally by 1200 projects from the main frame (not shown) of the equipment and carries the top rail 921 for one carrier chain and the bottom rail 922A for the carrier chain above so that the carrier chains are mounted one above the other. A further arm 1201 secured to the main frame is arranged parallel with the arm 945 on the carriers and is provided with 12 conducting strips 1202 arranged in recesses on an insulating base 1203 for use in connection with the setting mechanism. The setting magnets 1M to 12M are also indicated and are suitably secured, by means not shown, to the arm 1200. Five groups of magnets, one for each carrier chain, are provided at each operator's position.

Figure 10:
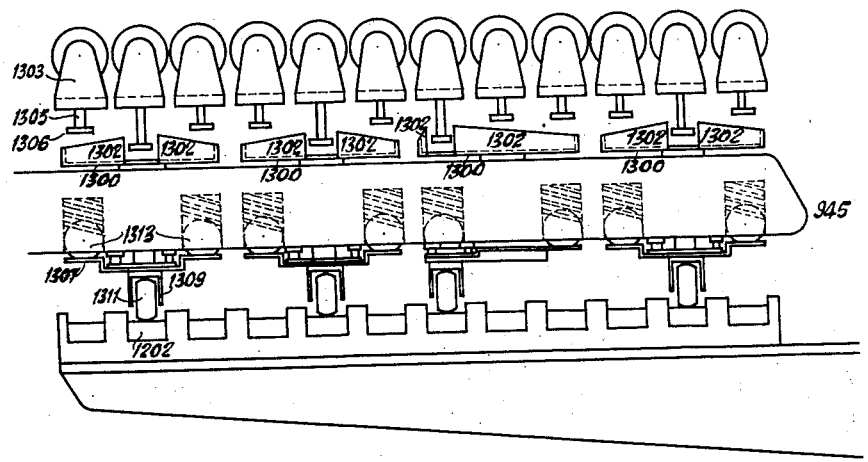
Figure 11:
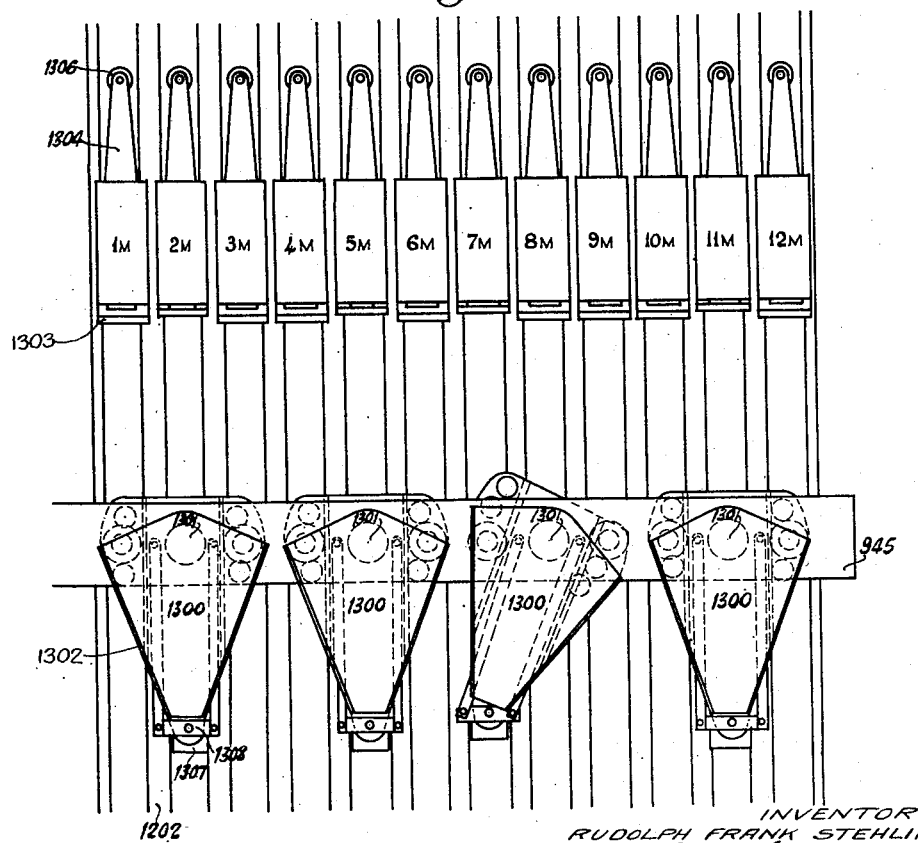
Figure 18:
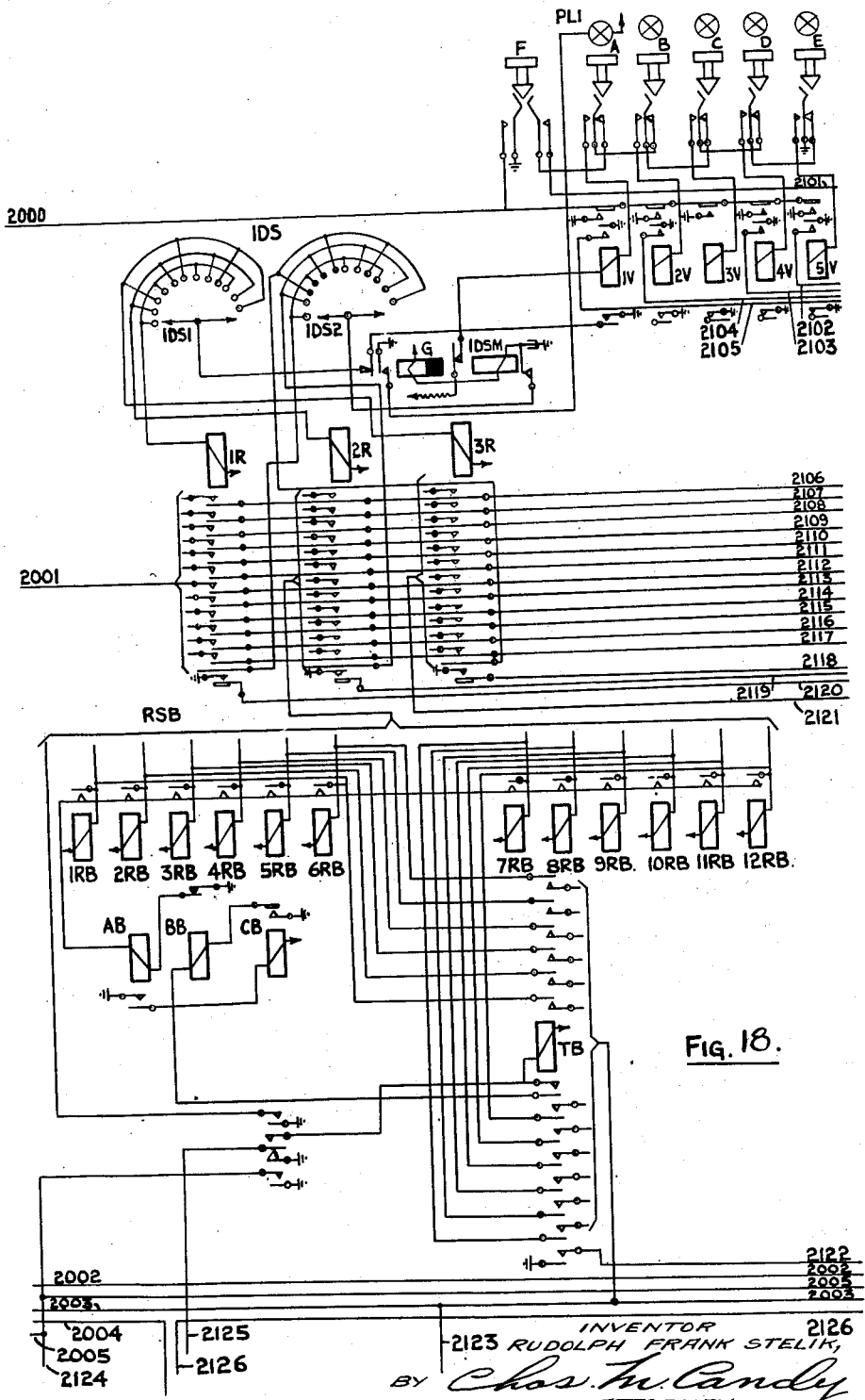
Figure 19:
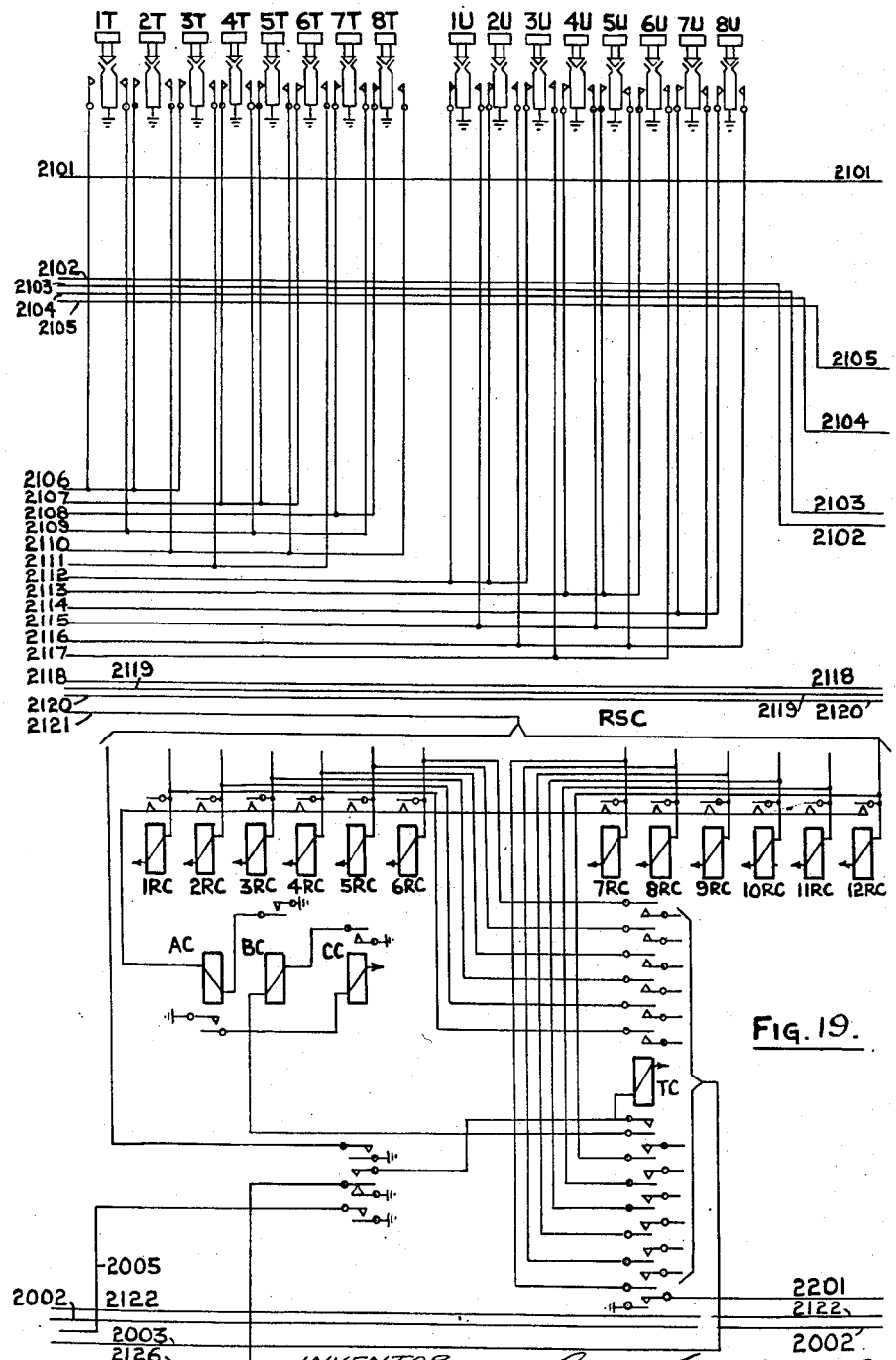

A detailed description will now be given of the setting arrangements with particular reference to Figs. 10 to 13. Mounted on the arm 945 are four substantially triangular shaped plates 1300 arranged to pivot about the points 1301. Each plate is provided with an upturned edge 1302 on each longer side, a gap between the two edges being provided at the apex. The armatures 1303 of each of the magnets 1M to 12M are provided with extensions 1304 at the free end of which are secured operating members 1305 each having a roller 1306 at its end. In the de-energised condition of the magnets, the rollers 1306 take up a position such that they are clear of the plates 1300 as the carrier passes the particular operator's position. When a magnet is energised, its associated roller may or may not engage with the walls of the plate according to the position last taken up by the plate. For instance, as shown in Fig. 11, the magnet 2M has been operated to indicate that the plate must take up the central position. Since the plate is already in this position, the operation of the magnet is without effect on the plate. The same is true of magnets 5M and 11M. The magnet 7M is also operated thereby indicating that the corresponding plate should take up the left-hand position (the position in which the plate is shown on the drawing), and this is effected by engagement of the roller with one of the side walls of the plate. It will be understood that, when the same carrier is again controlled by the magnet at another operator's position, this plate will be reset to the appropriate position as determined by the operation of the magnet.

Each of the plates 1300 is associated with a carriage 1307 mounted on the underside of the arm 945 on the same spindle 1301 as the associated plate so that the plate and carriage move together. The free end of the carriage is provided with a spindle 1308 on which are mounted the bracket 1309 (below the carriage) and the yoke 1310 (above the carriage). The bracket 1309 carries a roller 1311 adapted to engage with any one of three of the conducting strips 1202, straps 1312 being pivoted to the yoke 1310 and the arm 945 so that the roller 1311 retains its alignment with the conducting strips 1202 as the plate and carriage are rotated. The three positions which may be taken up by a plate are defined by spring-pressed balls 1313 located in recesses in the arm 945, each of which balls engage with one of three depressions 1314 in the carriage 1307. The spring-pressed balls also allow for the upward movement of the carriage as the roller passes over the insulating wall between the conducting strips. Two of the plates are set to characterize the tens digit of a destination receptacle and the other two are set to characterize the units digit and it will be seen that the three possible positions of the plates will give all numbers from 1 to 99.

As the letters are discharged from the carriers, they fall into destination receptacles which as previously mentioned are arranged in five levels. As shown in Fig. 16, the letters as they enter the destination receptacles rest on a flap 1900 secured to the spindle 1901 pivoted in the base of the receptacle 1902. The flap 1900 is provided with an extension 1903 which operates on the spring controlled rod 1904 which carries at its free end a flag 1905 bearing an arrow. Normally this flag is behind the mask 1906 but when the weight of the letters reaches a certain value indicating that the receptacle is becoming full, the flag 1905 projects to give a visual indication of this fact as shown in the drawing.

The receptacles are closed by a three-pronged grid 110 (Figs. 14 and 15), the top of which is secured to a bracket 1801 having a right-angle extension 1802. The bracket is mounted on the spindle 1803 which pivots in the fixed mounting 1804. A coiled spring 1805 is provided between the fixed mounting and the extension 1802, so that the grid is normally in the closed position. All that is necessary therefore to remove the letters is for the collector to insert his fingers between the three prongs of the grid and withdraw the letters by pressing back the prongs, the prongs immediately snapping back to the position shown in Fig. 15.

The electrical circuits of the equipment are shown in detail in Figs. 17 to 22, which should be arranged as shown in Fig. 23. These circuits include the arrangements for selecting a particular chain or level; the register or relay set on which the tens and units digits are registered; the circuits for controlling the movement of the conveyor; the circuits for controlling the carrier to discharge the letter into the appropriate destination receptacle and finally the circuits of the electromagnets for controlling the operation of the vanes in the chute leading to the carrier.

As previously mentioned, the operator is provided with three sets of keys, of which one set A to E (Fig. 18) is employed for selecting the level, a second set 1T to 8T (Fig. 19) is employed for registering the tens digit of the required destination receptacle and the third set 1U to 8U is employed for the units digit. In addition, there is a key F which is operated in the case of illegible or incorrectly addressed envelopes and which serves to direct the letter into a "dead letter" receptacle as previously mentioned.

The register equipment associated with each of the keys A to E comprises three relay groups RSA, RSB and RSC so that there will be a total of 15 relay groups for each operator's position. Each of these registers corresponds to one of the storage reservoirs 800, 801, 802 (Fig. 5) while a fourth register RSD (Fig. 21), which is provided on the basis of one for each level, has transferred to it the tens and units digits when a letter passes from one of the storage reservoirs to the discharge reservoir. When an idle carrier is available, the indications stored on the fourth register are transferred to the carrier as markings by the operation of the magnets 1M to 12M previously mentioned.

The three relay sets RSA, RSB and RSC provided for each key or level are arranged to be allocated for use in turn by means of a distributor switch 1DS. A second distributor 2DS is employed to transfer the registrations from any one of the registers RSA, RSB or RSC to the fourth register RSD.

The circuits of the equipment located on the carrier are shown in Fig. 22, where the relays 1CH and 2CH correspond to relays 1110 and 1109 shown in Fig. 8 while the solenoid 3CH corresponds to the solenoid 1102 shown in Fig. 8 and the magnet 4CH corresponds to the magnet 923 shown in Figs. 6 and 7. The four rollers 936-939 are also shown together with the four strips 940 (Fig. 21), 941, 942 (Figs. 21 and 22), 943 (Fig. 21) with which the rollers engage. The strips 940 and 943 are shorter than 941 and 942, engagement between the two latter strips and the rollers serving to feed battery and ground potential to the equipment on the carrier.

A detailed description will now be given of the method of operation and for this purpose it will be assumed that the operator has read the address on the last letter behind the glass in the conveyor and has determined that it is to go to destination receptacle 37 in the bottom level of receptacles and that the level key A and the tens key 3 and units key 7 have been operated. The operation of level key A closes a circuit for relay 1V (Fig. 18) and the operation of this relay serves to associate the tens and units keys with a pre-selected one of the registers RSA, RSB and RSC.

Thus, assuming that the register RSA has been preselected i. e. there is no letter in the storage reservoir 800, relay 1V at its lower armature extends ground over the left-hand outer armature of relay G, wiper 1DS1 on contact 1, winding of relay 1R to battery. Relay 1R in operating extends the leads 2106—2117 from the tens and units keys through cable 2001 to relay 1RA to 12RA of the relay set RSA and also closes the circuit to magnet 1ER which operates to open storage reservoir 800. In addition, relay 1V at its inner upper armature completes a circuit for magnet 1EV which controls the operation of the vanes 710, 711 to direct the letter from the chute 700 into the channel 707 (Fig. 20) and thus into storage reservoir 800.

Further, relay IV at its outer upper armature closes a circuit for the upper winding of relay K which operates and at its inner lower armature completes the circuit for the conveyor driving motor MO1 (Fig. 17). Relay K also closes at its upper armature a circuit for relay KA which operates and prepares a circuit for the electromagnet 511 (also shown in Fig. 3) in parallel with relay IS. The operation of the motor MO1 causes the conveyor to move forward to the extent of one step to thereby drop the letter in the chute 108 and to move the next letter before the operator, and during this forward movement contacts CS are closed to complete a locking circuit for relay K over its middle lower armature for the duration of the forward movement, the original circuit of relay K being opened on the release of the key. In addition, relay K at its outer lower armature short-circuits its second winding to make the relay slow-to-release. When the conveyor has completed its movement, the CS contacts are opened and relay K will release, stop the motor MO1 and complete a circuit over the operated contacts of relay KA for the electromagnet 511 and relay IS. As previously explained, the magnet 511 causes another letter to be transferred from the container 509 (Fig. 3) to a conveyor tray 512. At the same time, in releasing, relay K opens the circuit of slow-to-release relay KA so that the electromagnet 511 is operated only for the release period of relay KA. When relay KA releases, a circuit is also completed, for the release period of slow-to-release relay IS, for relay 2S. Relay 2S operates and locks over its inner contacts to ground at the inner contacts of relay 3S and at its outer contacts completes the circuit for the motor MO2 which drives the rollers 104 (Fig. 3). As previously explained, when a letter first passes between the last set of rollers 516 and 519, contacts 521 are closed thereby closing a circuit for relay 3S which opens the circuit for relay 2S but maintains the circuit for the motor MO2. The motor thus continues to operate until the letter passes out of contact with the rollers 516 and 519 when contacts 521 are opened thus causing relay 3S to release and open the circuit to motor MO2.

When the leads 2106—2117 from the tens and units keys are extended to relays 1RA to 12RA of the relay set RSA as previously described, the appropriate ones of relays 1RA to 6RA are operated in accordance with the tens digit and similarly appropriate ones of the relays 7RA to 12RA are operated in accordance with the units digit. In the particular example chosen, relays 1RA and 6RA will be operated for the tens digit and relays 9RA and 10RA for the units digit. These relays have a single make-contact over which they lock in series with relay AA to ground at the contacts of relay BA. Relay AA operates in this locking circuit and completes a circuit for relay CA which, in turn, prepares a circuit for relay BA at its upper contacts.

In addition, relay CA at its inner lower armature feeds ground back to contact 1 associated with wiper 1DS2 thereby marking register RSA as busy to the distributor 1DS, this ground being extended over the wiper, interrupter springs of the magnet 1DSM, magnet 1DSM, winding of relay G to battery. The magnet 1DSM and relay G operate in series and the wipers of 1DS are stepped to the next contact to pre-select the relay group RSB. Relay G, in operating, at its right-hand contacts opens the circuit for relay IV and at its left-hand outer contacts opens one point in the circuit for relay IR, another point being opened when wiper 1DS1 steps to contact 2. Finally, at its left-hand inner contacts, relay G closes a circuit for the lamp PL1 but this circuit is only closed for a short time. If, however, all the relay sets are in use, the wipers of the distributor 1DS will rotate continuously as long as this condition exists, since ground will be fed over wiper 1DS2 in successive positions. Further, since relay G is made slow-to-release, it will be maintained operated continuously during stepping and the lamp PL1 will glow steadily to indicate to the operator that all the relay sets associated with the key A are in use.

Returning now to the operation of relay CA, this relay at its outer lower contacts extends ground over lead 2005 to lead 2124 (Figs. 18 and 21) to operate relay U, at its lower contacts. Relay U closes a series circuit between the magnet 2DSM of the distributor 2DS and relay W and at its upper contacts closes the wiper of 2DS to a point intermediate magnet 2DSM and relay W. Ground is standing on the first two contacts in the bank of 2DS from contacts of relays CB and CC, this ground short circuiting relay W and also closing a self-interrupting circuit to magnet 2DSM whereupon the distributor operates to associate the relay set RSA with the common relay set RSD. Relay W, being short-circuited, does not operate and the wiper is stepped over contacts 1 and 2. On the wiper reaching contact 3, however, the ground is removed from the wiper and relay W operates from ground at the outer lower contacts of relay X, lower contacts of relay U, winding of relay W, contacts of magnet 2DSM, and magnet 2DSM battery. Magnet 2DSM does not operate in series with relay W. Relay W also, in operating, extends direct ground from the upper contacts of relay X over the wiper of the distributor 2DS to relay TA. Relay TA operates, closes itself in series with relay BA which at this time is short-circuited by ground at relay X and at its outer lower armature completes a circuit over lead 2002 for magnet 1ET which opens the trap 809 for the first storage reservoir 800 and allows the letter therein to pass into the discharge reservoir 900 as previously described. In addition, relay TA closes ground on the locking contacts of the operated ones of relays 1RA to 12RA over cables 2003 and 2123 to the windings of relays 1N to 12N of the fourth relay set RSD. The corresponding relays thereupon operate closing a circuit to relay X. Relay X operates, locks up to ground at relay Y through its middle inner armature, closes the direct ground from relay Y for locking the operated storage relays 1N—12N and relays 1RA—12RA over its inner lower armature, opens the circuit of relay W at its outer lower armature and prepares a circuit for relay Y at its upper armature. Also, when relay X operates, it removes ground at its upper armature from the wiper of distributor 2DS causing relay TA to lock over its inner lower armature in series with relay BA which now operates. Relay BA opens the circuit of relay AA which releases and opens the circuit for relay CA. Relay CA in releasing opens the circuit of relays BA and TA which release, relay TA opening the locking circuits to the operated 1RA—12RA relays which release. The relay set is now completely released and ready to be used for a further registration.

It will be understood that the operation of the equipment will be substantially similar to that described above if one of the other relay sets is taken into use. Thus, the operation of relay 2R or 3R serves to extend the leads 2106—2111 to relays 1RB to 12RB of relay set RSB or to relays 1RC to 12RC of relay set RSC. In addition, relay 2R completes a circuit at its outer lower armature 2119 for winding 1ER1 of magnet 1ER and winding 2ER2 of magnet 2ER. The vanes 803 and 804 (Fig. 20) now take up the position shown in the drawing to open the storage reservoir 801. A similar circuit is completed on the operation of relay 3R over lead 2118 for winding 2ER1 of magnet 2ER to open the storage reservoir 802.

Each relay set RSB and RSC is also provided with a group of three relays AB, BB, CB and AC, BC, CC which perform the same function as relays AA, BA, CA of the relay set RSA. The circuit of the test relay TB or TC of relay sets RSB or RSC is individual to the relay set and in the case of relay set RSB extends over lead 2125 to contact 1 in the bank of distributor 2DS while in the case of relay set RSC it extends over lead 2126 to contact 2.

Again, the operation of the equipment in response to the depression of other level keys is substantially similar to that described above. One of the relays 2V to 5V is operated to take into use a corresponding group of relay sets to those shown in the drawing. It will be understood that different sets of magnets M1—M12 will also be used in these cases since different carrier levels are concerned. It will also be noted that the operation of any of relays 2V, 4V or 5V will cause circuits to be completed over one of conductors 2104, 2103 or 2102 for magnets 2EV, 5EV or 4EV, the operation of relay 3V being without effect since the normal position of the vanes gives access to the required channel.

Returning now to the operation of the relay set RSD, the storage relays 1N to 12N now remain in their operated positions, locked up to ground at relay Y, until a free carrier arrives opposite the discharge reservoir. As previously mentioned, a test is made as each carrier passes the discharge reservoir, a roller 936 (Fig. 22) on the carrier engaging with the test strip 940 (Fig. 21). If the carrier is idle, ground from the outer lower armature of magnet 4CH (Fig. 22) which corresponds to magnet 923 shown in Figs. 6 and 7, will be extended through roller 936 and strip 940, outer lower armature of relay X to the winding of relay Z. Relay Z thereupon operates and at its lower armature closes a circuit for the solenoid magnet 914 which causes the letter to be transferred from the discharge reservoir to the carrier. In addition, relay Z at its upper armature completes a circuit for relay J which at its upper inner armature completes a holding circuit for itself in series with relay Y, which circuit is effective when relay Z releases after the roller 936 has passed over the test strip 940. In addition, relay J at its upper outer armature extends ground over the operated contacts of relays 1N to 12N to the windings of 1M to 12M which are fixedly mounted at the operator's position and which serve to position the plates 1300 (Figs. 10 and 11) on the carrier as previously described. By this means, the indications stored on the storage relays 1N to 12N are transferred to the carrier. Finally, relay J extends ground at its lower armature to the seizure strip 943 and thence through roller 939 to magnet 4CH which corresponds to the magnet 923 (Fig. 6), thereby causing the letter to be gripped between the rollers 927 and 933 as described with reference to Fig. 6. The electromagnet 4CH in addition completes a circuit over its middle lower armature and contacts 930 (Fig. 7) which are closed when a letter is passing under a roller 932, for the solenoid 3CH which corresponds to the solenoid 1102 shown in Fig. 8 and which serves to operate the clutch and cause the rollers 927 and 933 to rotate and draw the letter into the carrier. When the letter passes the roller 932, contacts 930 will open and the circuit of the solenoid 3CH will also be opened and the drive to the rollers 927 and 933 will be disconnected. In addition, magnet 4CH at its inner lower armature locks in series with a contact on the units relay 2CH (which corresponds with relay 1109, Fig. 8) and prepares the test circuit for the tens relay 1CH at its upper armature. When the roller 936 leaves the test strip 940, relay Z will release and remove ground from the winding of relay J. Relay J will, however, now lock in series with relay Y which operates and opens the circuit for relay X and the locking circuits for the storage relays 1N to 12N. Relay X in releasing opens the series circuit for relays Y and J which thereupon release. The release of the storage relays 1N to 12N also opens the circuits of the magnets 1M to 12M which thereupon release. The circuit is now completely restored for further use.

As previously described, for the purpose of selecting the appropriate receptacle, the carriers carry two pairs of conducting rollers which make rolling contact with strips arranged adjacent to the path followed by the carrier. In the particular arrangement shown, twelve conducting strips are provided and each of the two pairs of rollers may be set to engage with any one of three strips according to the tens and units digits of the destination receptacle (Figs. 10 and 11). The conducting strips are insulated from each other and from the corresponding strips at other positions. In Fig. 22, the rollers are indicated schematically as B1, B2, B3 and B4 and the conducting strips as A1 to A12. Each destination receptacle will have the associated conducting strips connected together in accordance with the number of the destination receptacle in such a manner that, when the pre-set rollers on the carrier encounter the strip at the desired destination receptacle, circuits will be completed through the rollers and the conducting strips for the two control relays 1CH and 2CH. For instance, in the example given above, where the number of the receptacle is 37, the circuit of the tens relay 1CH will be completed when the carrier passes a destination receptacle for which the tens digit is 3. This circuit will extend from ground on roller B2 through the appropriate pair of conducting strips which will be connected together at this position through the roller B1 and upper armature of magnet 4CH to relay 1CH. Relay 1CH in operating prepares the circuit for the units relay 2CH but the circuit for this relay will only be completed at the destination receptacle which has 3 as the tens digit and 7 as the units digit. The circuit will be completed through rollers B3 and B4 and relay 2CH, in operating, will complete its own locking circuit and again close a circuit for the solenoid 3CH whereupon the rollers 927 and 933 on the carrier are rotated to discharge the letter into the destination receptacle. It will be noted that the circuit for the electromagnet 4CH is maintained at this time over a contact of the tens relay 1CH.

It will be understood that the movement of the carrier is continuous during this operation and, when the rollers B1 to B4 pass off the conducting strips, the circuits of relays 1CH and 2CH will open. Relay 1CH will release first, since relay 2CH is arranged to be slow-to-release owing to its short-circuited lower winding, and relay 1CH will open the circuit of the electromagnet 4CH so that the roller 927 (Figs. 6 and 7) will return to its normal position and, in addition, the carrier will now be marked as idle by ground on the test roller 936 so that the carrier may, if desired, be used by the next operator.

The operation of the equipment consequent upon the operation of the dead letter key F will be obvious from the drawing, a circuit being completed over lead 2101 for magnet EF which opens the dead letter channel 701.

It will, of course, be understood that numerous modifications may be made to the apparatus without departing from the scope of the invention. For instance, the test circuits on the carrier need not be purely electrical as shown but the conducting strips may be replaced by fingers projecting into the path of the rollers so that a mechanical movement is imparted to a member when all the rollers engage with a projection. Suitable mechanical interlocks would be provided between the fingers and the letter would be discharged under the control of the member operated thereby. Other means such as an arrangement of variably positioned permanent magnets may also be used to obtain the desired effect. Further, the electrical circuits shown may be modified for instance by associating the tens and units relays with the destination receptacle rather than with the carrier. These relays would then be connected between the strips and when both are operated they would complete a circuit which would cause the release of the electromagnet 4CH, the letter falling into the receptacle under gravity.

I claim:

1. In an article sorting apparatus, a plurality of operators' positions, a plurality of keying units, each of said keying units comprising operator's control means at one of said operators' positions, a plurality of continuously moving carrier chains, each of said carrier chains having a plurality of carriers, each of said carriers so positioned as to enable discharge of its contents into a particular group of destinations, means responsive to the operation of one of said keying units for directing an article from the associated operator position to one of said carrier chains, means included in each carrier of said chains to provide a busy or idle indication, means responsive to an idle indication by one of said carriers of said one carrier chain to further direct said article into said idle carrier, a receptacle, means in said receptacle to provide a destination code, and means made effective by said one keying unit for causing said one idle carrier to deposit said article into the receptacle having the designated code.

2. An article sorting apparatus as claimed in claim 1 in which said means in said receptacle comprises, distinctively connected fixed conductors providing code marking, and in which said means for causing said idle carrier to deposit said article comprises variably-positioned conducting members in said carrier positioned by said one keying unit to provide for a discharge of an article into a receptacle only when said variably positioned members are in accord with the code marking of the receptacle.

3. In an article sorting apparatus, an operator position, a chute associated therewith, a plurality of discharge reservoirs and a plurality of magnetically controlled vanes in said chute, operator controlled means for operating certain of said magnetically controlled vanes to direct an article through said chute to a particular discharge reservoir as the first stage in the sorting operation, a continuously moving carrier chain having a plurality of carriers accessible to said selected discharge reservoir, a stop member on each discharge reservoir for stopping an article, a solenoid on each discharge reservoir, means controlled by an available carrier of said chain reaching said discharge reservoir for operating said solenoid, a member operated by said solenoid to remove said stop member to enable an article to be deposited in said available carrier, and operator controlled means for operating said available carrier to direct said available carrier to a particular destination as the final stage of the sorting operation.

4. In an article sorting apparatus, an operator position, a chute associated therewith, a plurality of discharge reservoirs in said chute, means for depositing an article into said chute, directing means in said chute for directing an article from said position through said chute to a particular selected discharge reservoir as the first stage in the sorting operation, a continuously moving carrier chain having a plurality of carriers thereon accessible to said selected discharge reservoir, a stop member on said discharge reservoir for stopping an article, a solenoid on said discharge reservoir, means controlled by an available carrier of said chain becoming adjacent to said discharge reservoir for operating said solenoid, a member operated by said solenoid for removing said stop member to enable an article to be deposited in said available carrier, driving means in said carrier for positively drawing a deposited article from said discharge reservoir into said available carrier, and means controlled from said operator position for operating said available carrier to direct said available carrier to a particular destination as the final stage of the sorting operation.

5. In an article sorting apparatus, a carrier chain having a plurality of carriers, a keying unit, a plurality of relay sets for said carrier chain, means operated by the keying unit for preselecting a particular one of said sets of relays, a circuit operated by said keying unit for registering a plurality of digital representations on said selected relay set, a transfer relay set connected to said sets of relays, and circuit means for operating said transfer relay set to transfer the digital representations from said operated relay set to an available carrier of said carrier chain.

6. In an article sorting apparatus, a chute having a plurality of storing stations for receiving articles to be sorted, a plurality of continuously moving carrier chains, there being one of said chains for each said station of said chute, electromagnetically controlled means in said chute for directing an article in said chute to any one of said stations, electric circuits for operating said electromagnetically controlled means, selective manual control means for selectively controlling said electric circuits to operate said electromagnetically controlled means to direct said article to a selected one of said stations to thereby select the corresponding carrier chain, a plurality of carriers in each of said chains for receiving said articles from said stations, and automatic means for effecting the insertion of said article into an available carrier of said selected chain from said selected station in said chute in response to the movement of said available carrier adjacent to said selected station.

7. In an article sorting apparatus as claimed in claim 6, a receptacle associated with said selected chain for receiving said article, means in said receptacle for providing a destination code, and a control circuit operated by said selective manual control means in accordance to the destination code for operating said available carrier to effectuate said available carrier depositing said article into said receptacle having the destination code therein.

8. In an article sorting apparatus, a plurality of continuously moving carrier chains, a plurality of article carriers in each chain, a plurality of operator positions, means at each said operator position for directing an article from the said operator position to any one of said carrier chains, operator controlled selecting means for actuating said article directing means to thereby automatically direct an article to a selected one of said carrier chains, means for automatically depositing said article into a carrier in said selected carrier chain, and means for automatically affixing to said carrier a marking that will determine into which receptacle the article will be discharged.

9. An article sorting apparatus as claimed in claim 8 in which said article directing means comprises a chute including a plurality of magnetically controlled vanes therein for directing the article through the chute to any selected one of the carrier chains.

10. In an article sorting apparatus as claimed in claim 8, a movable wall, an inclined wall against which said movable wall urges stacks of unassorted articles in order to arrange all articles therein in upright position, a plurality of pairs of guide rollers rotating at different speeds to separate individual articles from the stack, a conveyor chain for positioning an article received from said pairs of rollers in front of said operator's position and for depositing an article in said chute, and means controlled by operation of said selecting means for stepping said conveyor chain to deposit an article in said chute and to position another article in front of the said operator's position.

11. In an article sorting apparatus for use in sorting articles whereby the sorting operation is conducted in two stages, a plurality of continuously moving carrier chains each including a plurality of article carriers, article directing means for directing an article to any one of said carrier chains, operator controlled means for actuating said article directing means to thereby direct an article to a selected one of said carrier chains to thereby complete the first stage in the sorting operation, a plurality of groups of article receptacles, all receptacles in certain of said groups being accessible to all the article carriers in certain of said carrier chains, means for automatically depositing said article into a carrier in said selected carrier chain, and second operator controlled means for selecting a receptacle into which said article is to be deposited in the group of receptacles accessible to the carriers in said selected carrier chain to thereby complete the second stage in the sorting operation.

12. In an article sorting apparatus, a plurality of groups of article receptacles, the groups of receptacles being superposed, the receptacles in each group being arranged in successive order along an extended route, a plurality of continuously moving carrier chains each comprising a plurality of article carriers, each carrier chain being associated with different ones of the receptacle groups, the carrier chains continuously moving along the extended routes adjacent to their associated groups of receptacles, a plurality of sorting operators' positions, means for providing access for articles to each of said carrier chains from each of said positions, said positions having access to said chains at spaced intervals along said route, and means for depositing an article from any of said positions into any idle one of said carriers in any of said carrier chains.

13. In an article sorting apparatus, a continuously moving carrier chain, a plurality of article carriers in said chain, a chute for directing articles to said carrier chain comprising a plurality of storage reservoirs and a discharge reservoir common to said storage reservoirs, each of said reservoirs being capable of holding any article directed thereto, first selecting means for selecting any one storage reservoir to which an article deposited in said chute is delivered, release means for automatically releasing an article from any one of said storage reservoirs to said common discharge reservoir when empty, and means for automatically discharging an article from said discharge reservoir into an idle carrier in said carrier chain under control of the carrier.

14. In an article sorting apparatus as claimed in claim 13, distributor means for controlling said first selecting means to cause said storage reservoirs to be selected in successive order for receiving articles, and a second distributor for causing said release means to release articles from said storage reservoirs in the same order in which they were received thereby.

15. An article sorting apparatus as claimed in claim 13 in which said first selecting means comprises a plurality of magnetically operated vanes and a keying unit for controlling said vanes to direct an article to any selected storage reservoir.

16. An article sorting apparatus as claimed in claim 13 in which said release means comprises a plurality of magnetically operated vanes or a plurality of trap doors, one for each of said storage reservoirs, and means for automatically operating said vanes at different times to release said articles from the storage reservoirs to the discharge reservoir.

RUDOLPH FRANK STEHLIK.

References Cited in the file of this patent

UNITED STATES PATENTS

| Number | Name | Date |
|---|---|---|
| 1,246,358 | Trew | Nov. 13, 1917 |
| 1,278,523 | Trew | Sept. 10, 1918 |
| 1,375,241 | Trew | Apr. 19, 1921 |
| 1,442,126 | Cadden | Jan. 16, 1923 |
| 1,453,125 | Briggs | Apr. 24, 1923 |
| 1,774,447 | Marchand et al. | Aug. 26, 1930 |
| 1,832,517 | Werner | Nov. 17, 1931 |
| 2,010,130 | Barnes | Aug. 6, 1935 |
| 2,046,935 | Cadman | July 7, 1936 |
| 2,194,381 | Cadman | Mar. 19, 1940 |
| 2,328,317 | Wentworth | Aug. 31, 1943 |

FOREIGN PATENTS

| Number | Country | Date |
|---|---|---|
| 241,598 | Great Britain | Oct. 28, 1925 |